(12) United States Patent
Chen

(10) Patent No.: US 6,516,659 B2
(45) Date of Patent: Feb. 11, 2003

(54) ELECTRONIC TIRE PRESSURE GAUGE WITH A ROTARY PRESSURE MEASURING HEAD

(75) Inventor: Tuz-Fen Chen, Taipei (TW)

(73) Assignee: Shinnyi Technology Co., Ltd., Tao Yuan (TW)

( * ) Notice: Subject to any disclaimer, the term of this patent is extended or adjusted under 35 U.S.C. 154(b) by 21 days.

(21) Appl. No.: 09/851,978

(22) Filed: May 10, 2001

(65) Prior Publication Data

US 2002/0166370 A1 Nov. 14, 2002

(51) Int. Cl.⁷ .......................... E01C 23/00; G01M 17/02
(52) U.S. Cl. ......................................................... 73/146
(58) Field of Search ............................... 73/146–146.8, 73/744; 702/140

(56) References Cited

U.S. PATENT DOCUMENTS 5,394,343 A * 2/1995 Tsao ............................ 364/558
5,435,173 A * 7/1995 Hwang ....................... 73/146.8

* cited by examiner

*Primary Examiner*—William Oen
*Assistant Examiner*—Marissa Ferguson
(74) *Attorney, Agent, or Firm*—Varndell & Varndell, PLLC

(57) ABSTRACT

An electronic tire pressure gauge with a rotary pressure measuring head is disclosed. A meter body is rotatably engaged with respect to the pressure measuring head. A light emitting element is installed at a select position of the pressure measuring head so as to provide a sufficient illumination in the dark. Thereby the user may find the air tap easily.

11 Claims, 9 Drawing Sheets

ELECTRONIC TIRE PRESSURE GAUGE WITH A ROTARY PRESSURE MEASURING HEAD

FIELD OF THE INVENTION

The present invention relates to an electronic tire pressure gauge with a rotary pressure measuring head, wherein the pressure measuring head of the electronic tire pressure gauge is buckled with the meter body, so that the pressure measuring head is rotatable to acquire a preferred measuring orientation.

BACKGROUND OF THE INVENTION

Conventionally, a tire pressure gauge has a measuring post hidden at the distal end of the meter body. It is telescopic according to the tire pressure. The tire pressure is displayed by the scale in the post. When the tire pressure is high, the post has a larger protruded length, and vice versa. Another, electronic tire pressure meters are developed. In that, a pressuring sensing electronic element is installed at an inner wall of the air tap of pressure measuring head. The inner and outer wall of the meter body is installed with a circuit board (PC board), a liquid crystal panel, a switching button, batteries and other components. Thereby, when the air tap of the pressure measuring head is inserted into the tap of a tire, the pressuring sensing electronic element serves to sense the tire pressure and the measured pressure is digitally displayed on the liquid crystal panel. However, in this prior art electronic tire pressure meter, since the pressure measuring head is fixedly combined to the meter body, when the tire is still, since the positions of the taps of four wheels are randomly distributed, the pressure measuring head must be matched to the positions of the taps for measuring the tire pressure. However, the positions of the taps of four wheels are randomly distributed, the liquid crystal panel can not always face to the user. Thus, it is often that the user must be pulled out the electronic tire pressure gauge for checking the pressure value. The use is not convenient. Furthermore, since the electronic tire pressure gauge has no light source, as in the dark or when the illumination is weak, the user must take time to look for the correct position of a tap. However, this is inconvenient to the user.

SUMMARY OF THE INVENTION

Accordingly, the primary object of the present invention is to provide an electronic tire pressure gauge with a rotary pressure measuring head. In that, a meter body is rotatably engaged with respect to the pressure measuring head. By the elastomer of the meter body and the stopper of the pressure measuring head, the pressure measuring head may rotate with respect to the meter body through 360 degrees so as to match the air nozzzle of a tire and thus to decide an optimum position. Thus, the tire pressure can be measured conveniently and check the value of the tire pressure.

Another object of the present invention is to provide an electronic tire pressure gauge with a rotary pressure measuring head, wherein a stopper is installed at the inner lateral side of the pressure measuring head, and an elastomer is installed with respect to the meter body. The inner edge of the pressure measuring head may be installed with a plurality of grooves which are arranged around the edge and the elastomer is formed with a respective protrusion which can be buckled to the grooves on the edge of the pressure measuring head and may be adjusted from one groove to another groove. Therefore, no matter the pressure measuring head is rotated to any angle, a preferred positioning can be obtained.

A further object of the present invention is to provide an electronic tire pressure gauge with a continuous rotary pressure measuring head, wherein one lateral side of the conductive disk is installed with a plurality of adjacent conductive tracks, while another surface is used to be connected pins of selective electronic elements (such aforesaid pressure sensing electronic element or the light emitting element described hereinafter) to the conductive tracks. By aforesaid structure, the plurality of conductive pins spaced engaged to the meter.body are contact with the selective tracks of the conductive disk of the pressure measuring head so that as the pressure measuring head rotates through 360 degrees, it will retain with preferred conduction of signals and power with meter body. The wire winding incorrectly between the meter body and the pressure measuring head is avoided. Therefore, it may prevent the tire meter pressure from improper use.

The various objects and advantages of the present invention will be more readily understood from the following-detailed description when read in conjunction with the appended drawing.

DETAILED DESCRIPTION OF THE PREFERRED EMBODIMENTS

Figure 1:
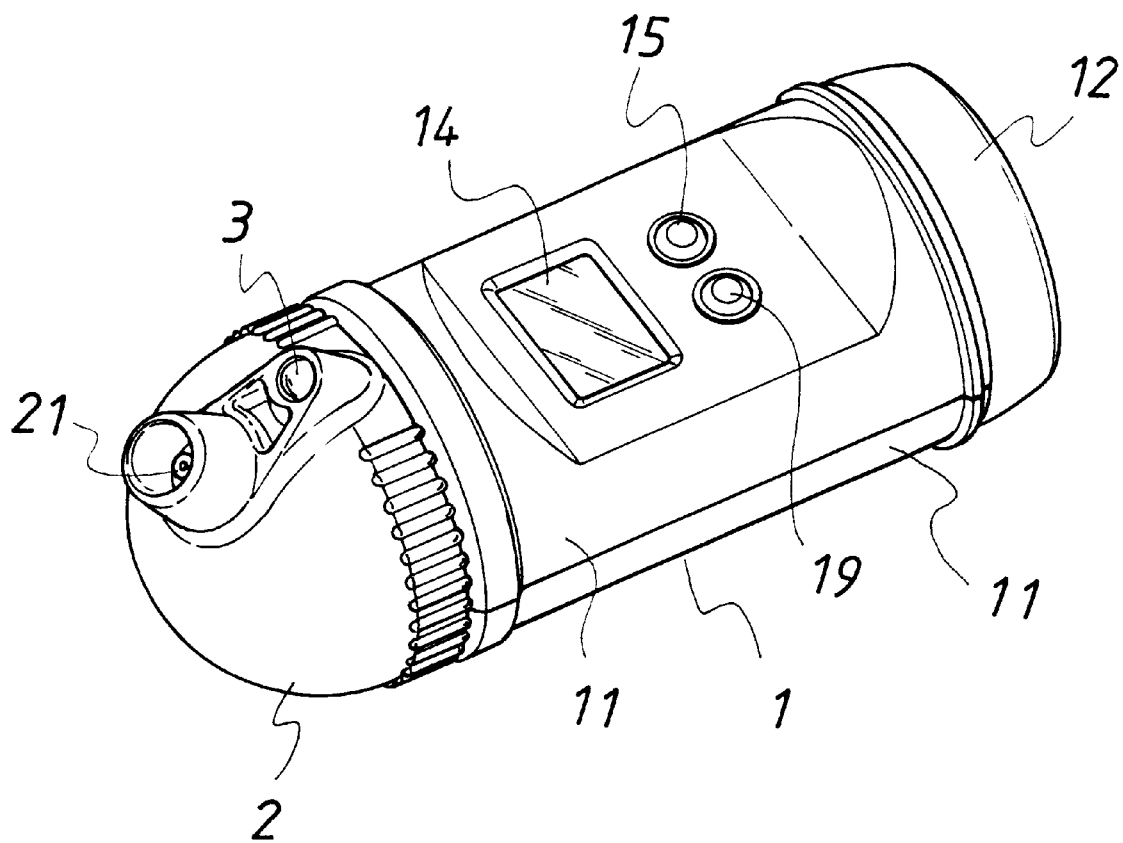
FIG. 1 is an assembled perspective view of the first embodiment in the present invention.
Figure 2:
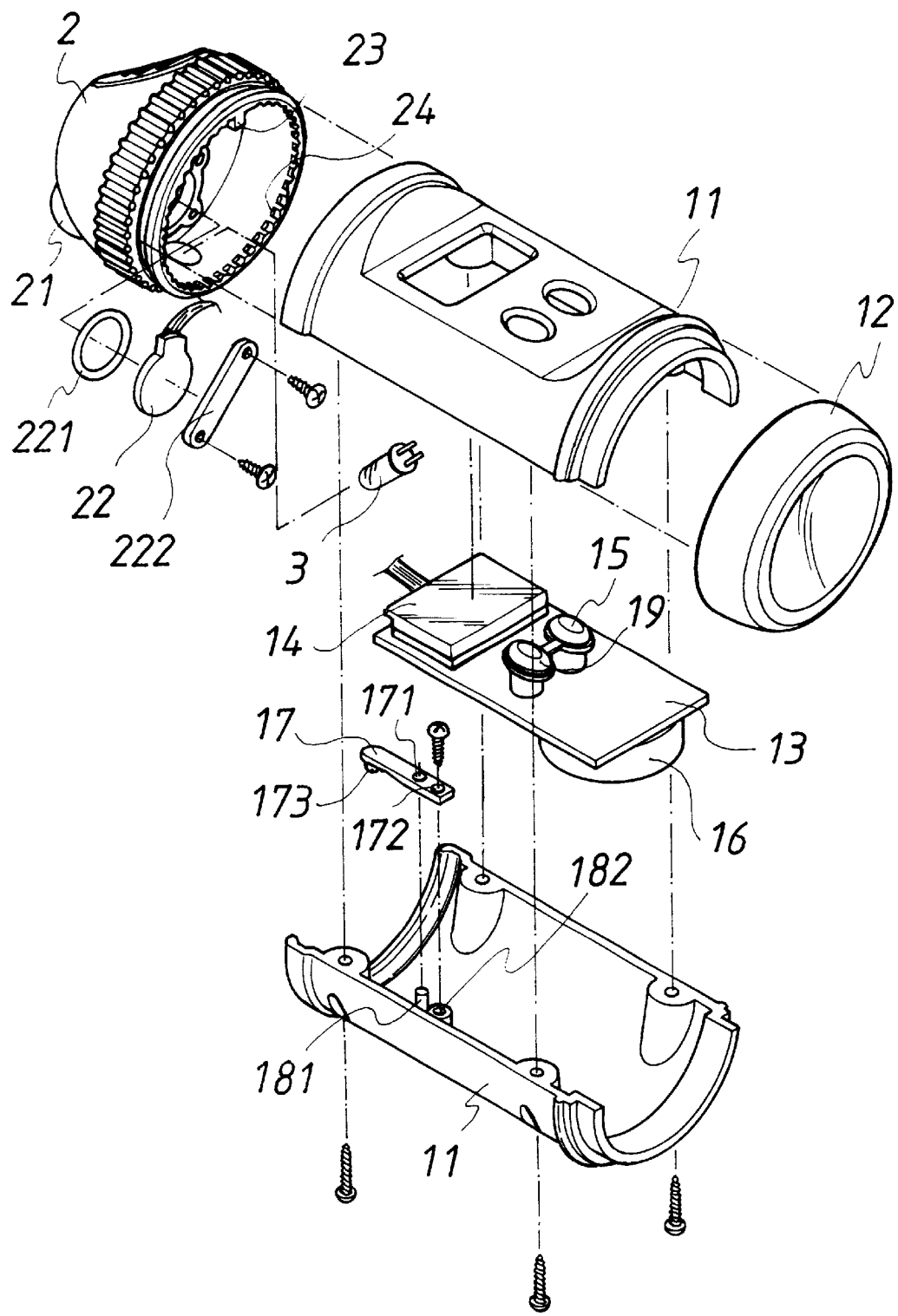
FIG. 2 is an exploded perspective view of the first embodiment in the present invention.
Figure 3:
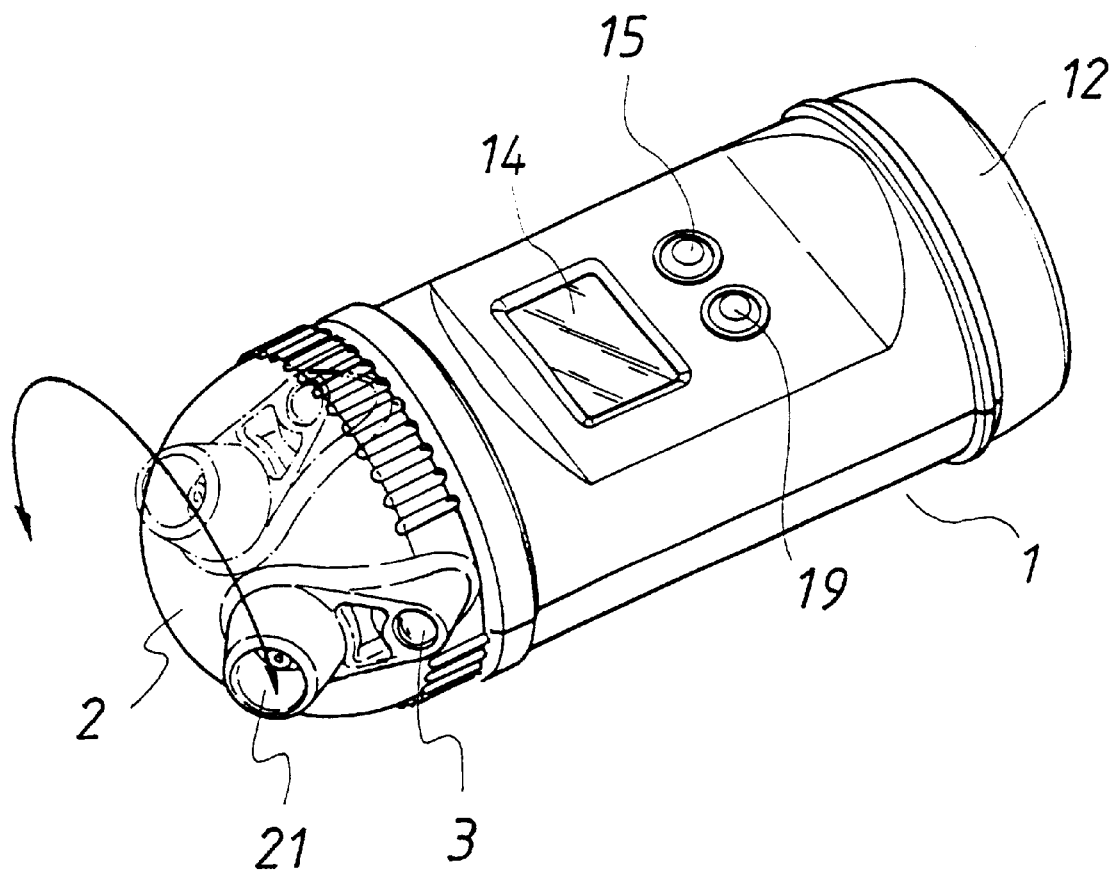
FIG. 3 is a schematic perspective view showing that the pressure measuring head is rotating in the first embodiment of the present invention.
Figure 4:
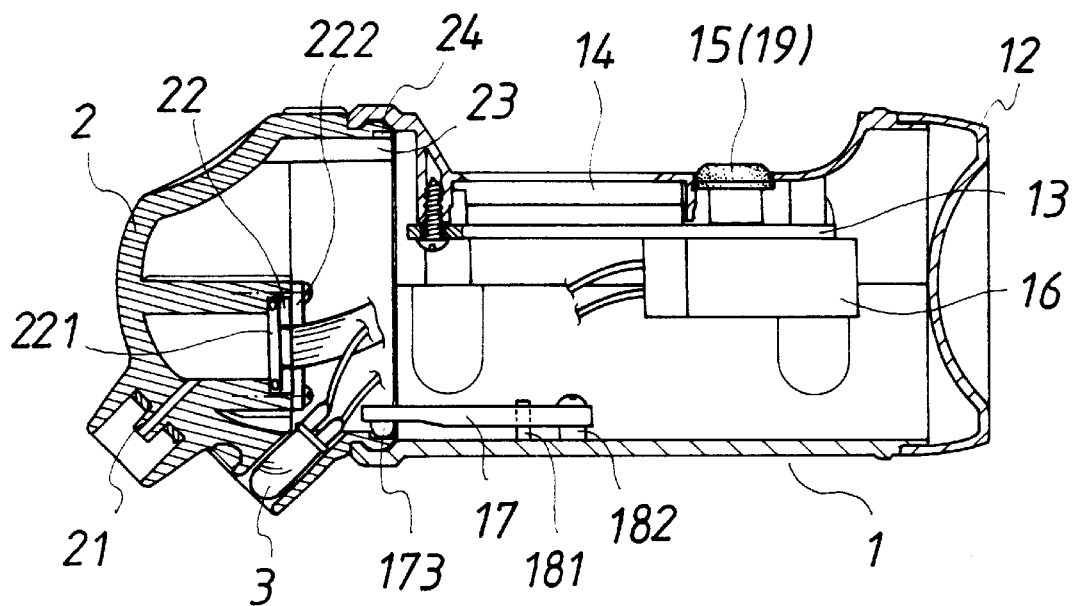
FIG. 4 is a cross sectional view showing that after rotating, the pressure measuring head faces downwards according to first embodiment in the present invention.
Figure 5:
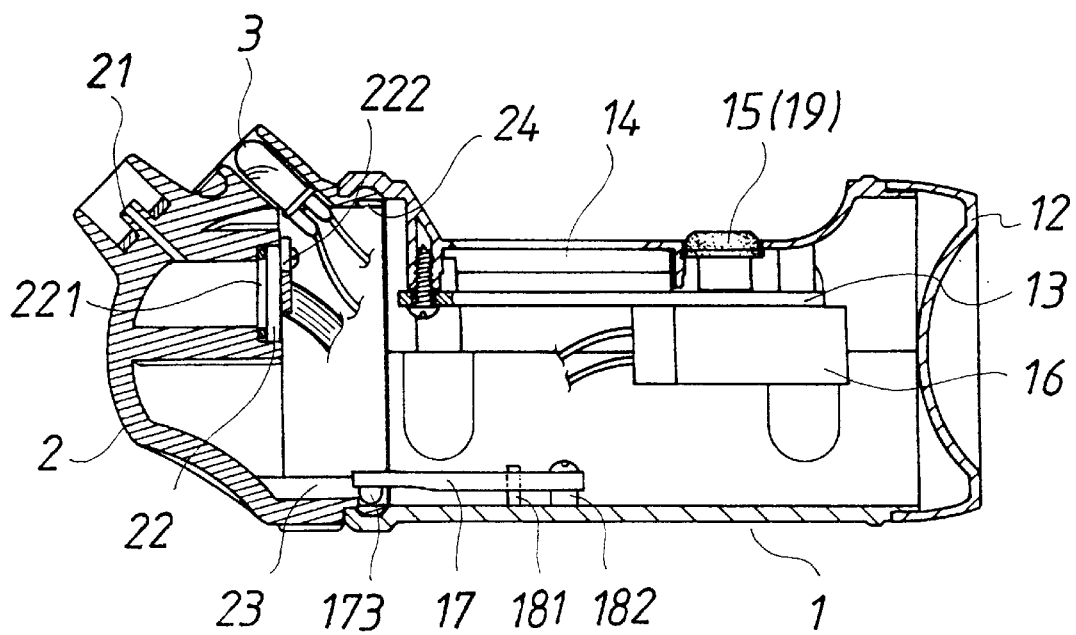
FIG. 5 is a cross sectional view showing that in the first embodiment of the present invention, after rotating, the pressure measuring head faces upwards.
Figure 6:
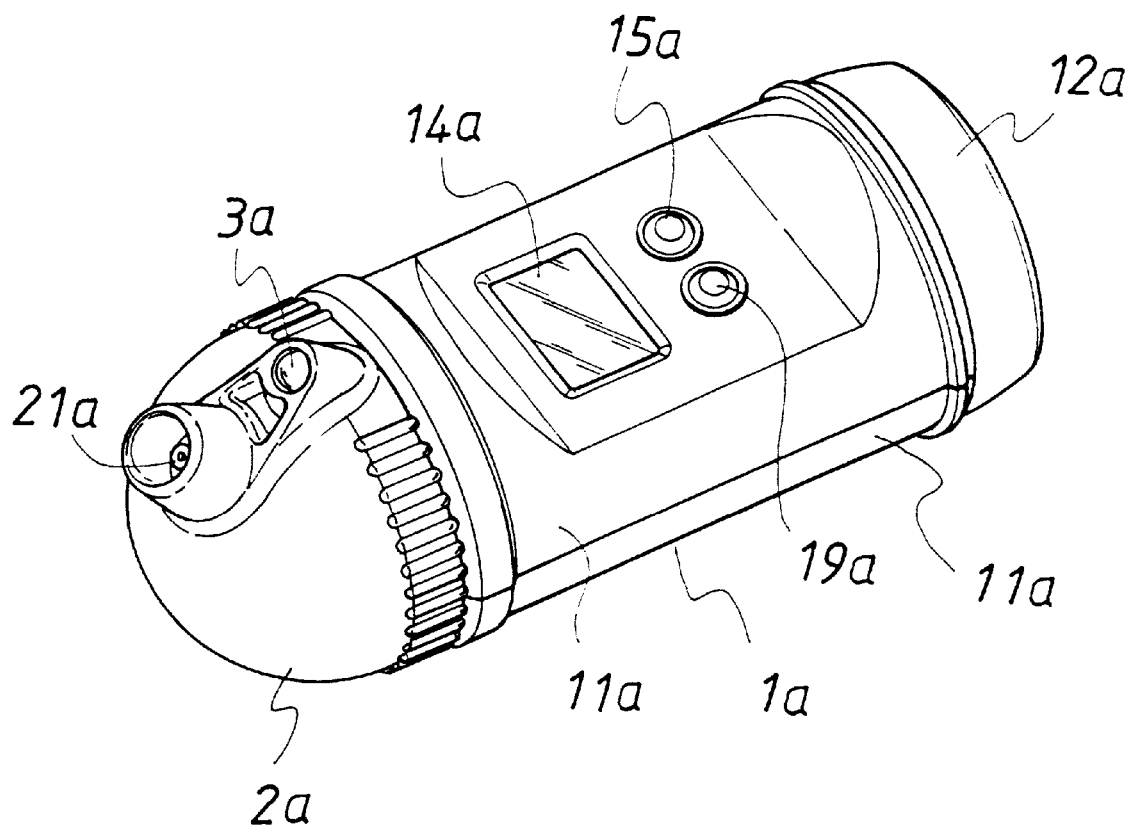
FIG. 6 is an assembled perspective view of the second embodiment in the present invention.
Figure 7:
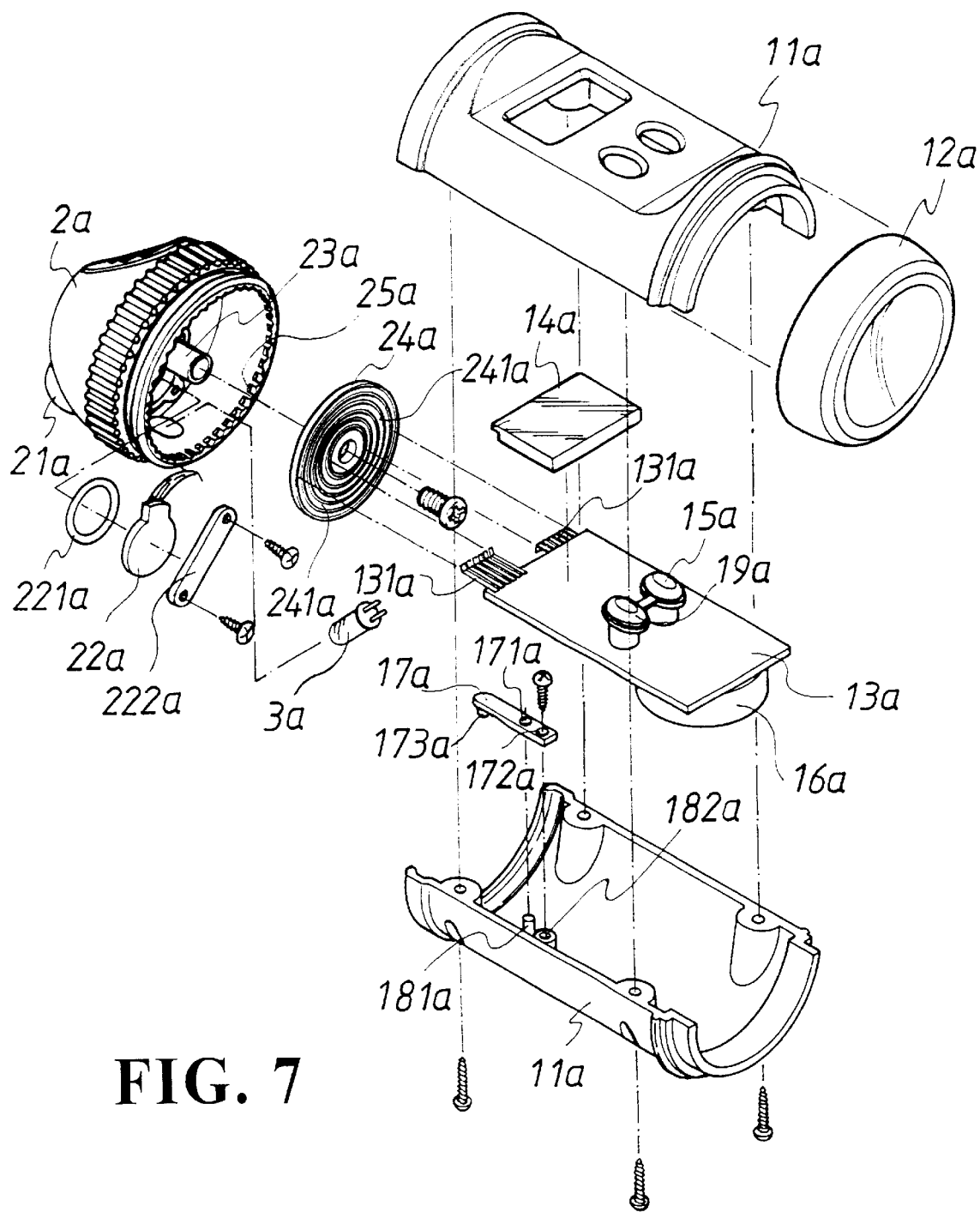
FIG. 7 is an exploded perspective view of the second embodiment in the present invention.
Figure 8:
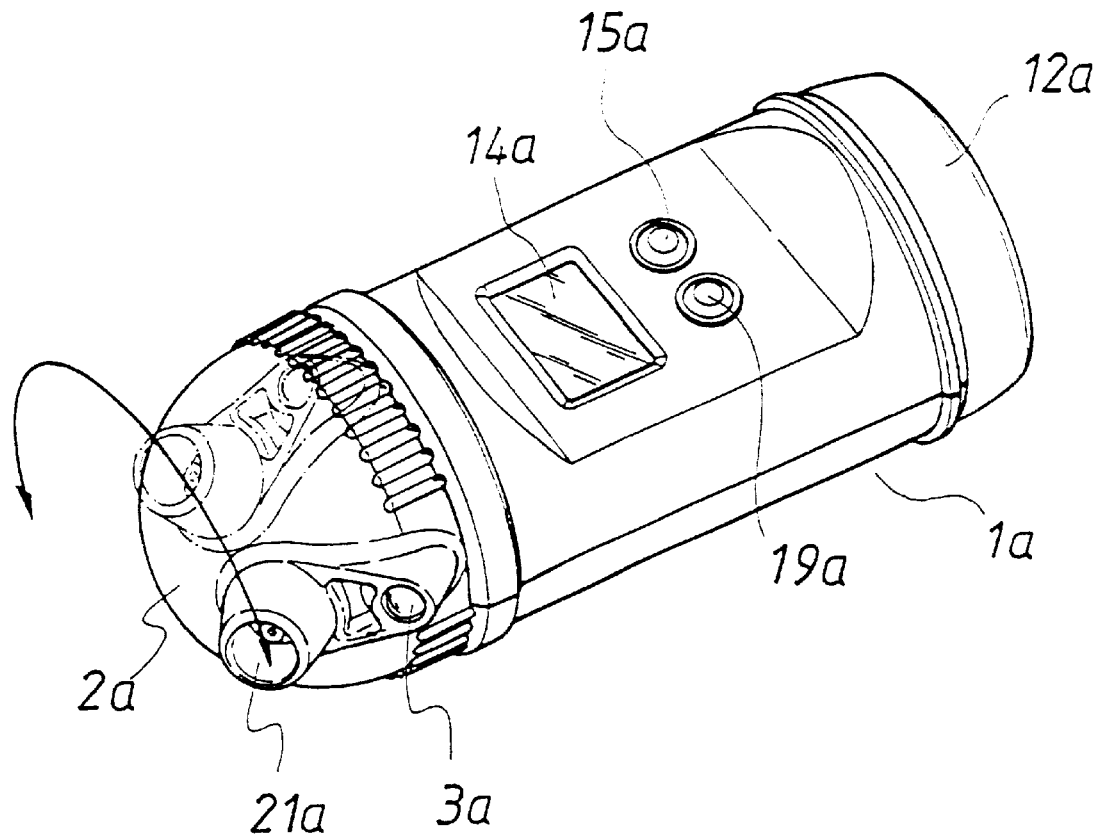
FIG. 8 is a schematic perspective view showing that the pressure measuring head is rotating in the second embodiment of the present invention.
Figure 9:
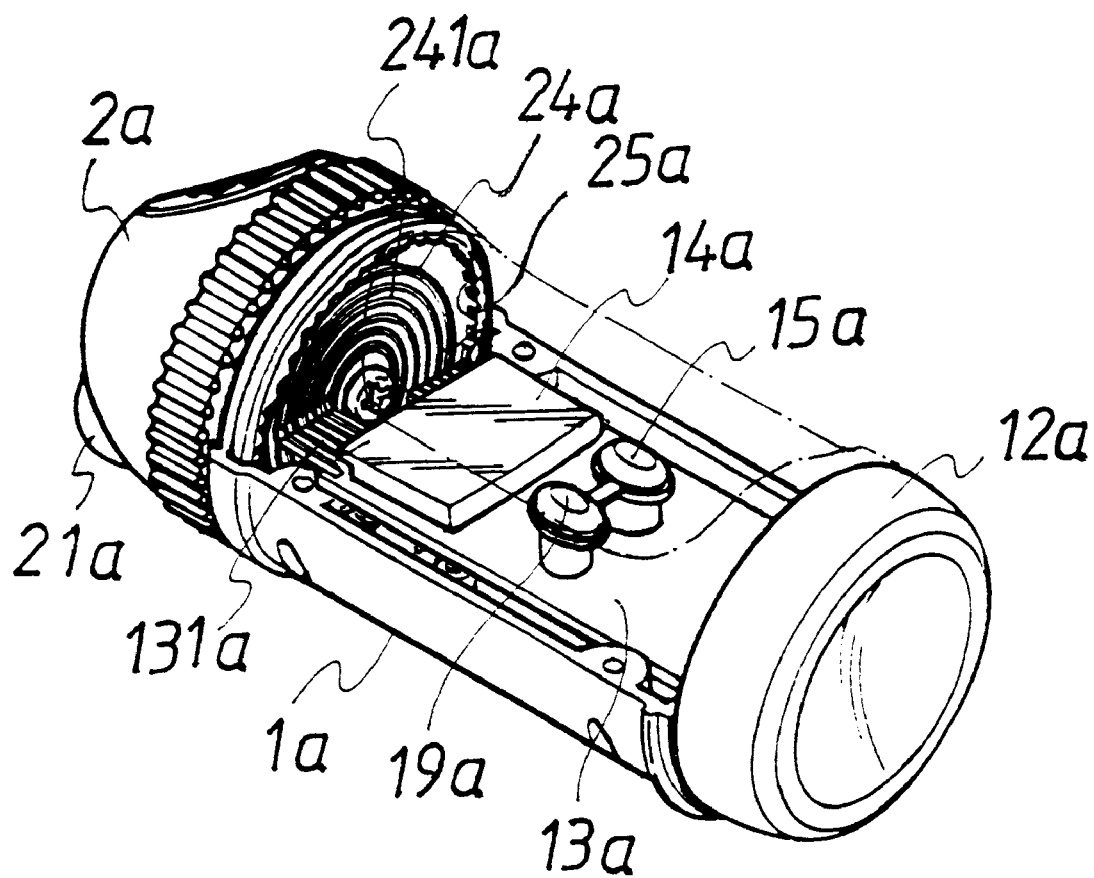
FIG. 9 is a partial schematic perspective view of the second embodiment in the present invention.

In order that those skilled in the art can further understand the present invention, a description will be described in the following in details. However, these descriptions and the appended drawings are only used to cause those skilled in the art to understand the objects, features, and characteristics of the present invention, but not to used to confine the scope and spirit of the present invention defined in the appended claims.

Referring to FIGS. 1 to 5, the electronic tire pressure gauge with a rotary pressure measuring head of the present invention is illustrated. The electronic tire pressure gauge in the first embodiment includes a meter body 1 and a pressure measuring head 2.

The meter body 1 is formed by locking two casings 11, and a rear cover 12 (if necessary, this rear cover 12 can be neglect so as to be formed as an integral structure) is engaged at the distal end of the meter body. A circuit board (PC board) 13, a liquid crystal panel 14, a power switching button 15, and a battery seat 16 for receiving a battery are arranged in the meter body. The meter body 1 is rotatably engaged with respect to the pressure measuring head 2 (referring to FIG. 3). An elastomer 17 is firmly secured (locking to) at a select portion.

The inner wall of the pressure measuring head 2 is installed with a pressure sensing electronic element 22. The pressuring sensing electronic element 22 is mounted with an air tight element 221 at he peripheral wall, and a pressuring plate 222 resists against the pressuring sensing electronic element 22 and locks it. The inner wall of the pressure measuring head 2 is installed with a stopper 23 so that the stopper 23 may stop the elastomer 17 of the meter body 1.

By the elastomer 17 of the meter body 1 and the stopper 23 of the pressure measuring head 2, the pressure measuring head 2 may rotate with respect to the meter body 1 through 360 degrees so as to match the air tap of a tire and thus to decide an optimum position. When the tire locates still, despite the tire is at any position on the edge of a tire, the liquid crystal panel 14 may correctly face to the user (referring to FIGS. 4 and 5) so as to measure the tire pressure conveniently and check the value of the tire pressure.

The elastomer 17 in the meter body 1 has two openings 171, 172. A pin 181 and a post 182 are located on the meter body 1 at positions with respect to the two openings 171,172 so that they can be engaged with one another and then are locked.

In the pressure measuring head 2 of the aforesaid electronic tire pressure meter, as the air tap 21 is inserted into the tap of a tire, the pressuring sensing electronic element 22 serves to sense the pressure automatically so that the measured signal can be transferred the circuit board 13 of the meter body 1 and is digitally displayed on the liquid crystal panel 14. The switching button 15 serves to switch a power source for turning on or open the pressure measuring of the electronic tire pressure meter. However, these are known in the prior art, and thus the details will not be described herein.

In the aforesaid electronic tire pressure gauge with a rotary pressure measuring head, the inner edge of the pressure measuring head 2 may be installed with a plurality of grooves 24 which are arranged around the edge and the elastomer 17 is formed with a respective protrusion 173 which can be buckled to the grooves 24 on the edge of the pressure measuring head 2 and may be adjusted from one groove to another groove. Therefore, no matter the pressure measuring head 2 is rotated to any angle, a preferred positioning can be obtained.

In the electronic tire pressure gauge with a rotary pressure measuring head of the present invention, a light emitting element 3 is installed at a select position of the pressure measuring head 2. The light emitting element 3 is connected to an illumination switching button 19 installed at predetermined position at the outer side of the meter body 1. Thus, in the dark, or as the illumination is too weak, the switching button 19 serves to provide a sufficient illumination so that the user may look for the tap conveniently.

Referring to FIGS. 6 to 10, the electronic tire pressure gauge with a continuous rotary pressure measuring head of the present invention is illustrated. The electronic tire pressure gauge in the first embodiment includes a meter body 1a and a pressure measuring head 2a.

The meter body 1a is formed by locking two casings 11a, and a rear cover 12a (if necessary, this rear cover 12a can be neglect) is engaged at the distal end of the meter body. A circuit board (PC board) 13a, a liquid crystal panel 14a, a power switching button 15a, a battery seat 16a and others. The meter body 1a is rotatably engaged with respect to the pressure measuring head 2a (referring to FIG. 8). An elastomer 17 is firmly secured (locking to) at a select portion in the meter body 1a. The elastomer 17a has two opens 171a and 172a for being locked to the pin 181a and 182a of the meter body 1a. However, in the meter body 1a, at an end with a circuit board 13a therein is installed with a plurality of conductive pins 131a which can be alternatively arranged at the left and right sides (such as that disclosed in the embodiment illustrated in the drawings), or arranged as desired so that one is adjacent to another. Furthermore, each conductive pin 131a is formed by punching an elastic metal so that it has a preferred signal and power connection with the following conductive disk 24a.

The inner wall of the air inlet 21a of the pressure measuring head 2a is installed with a pressure sensing electronic element 22a. The pressuring sensing electronic element 22a is mounted with an air tight element 221a at he peripheral wall, and a pressuring plate 222a resists against the pressuring sensing electronic element 22 and locks it. Furthermore, a center of the pressure measuring head 2a is installed with a locking post 23a for locking and positioning a conductive disk 24a. One lateral side of the conductive disk 24a is installed with a plurality of adjacent conductive tracks 241a, while another surface is used to be connected pins of selective electronic elements (such aforesaid pressure sensing electronic element 22a or the light emitting element 3a described hereinafter) to the conductive tracks 241a.

By aforesaid structure, the plurality of conductive pins 131 spaced engaged of the meter body 1a are contact with the selective track 241a of the conductive disk 24a of the pressure measuring head 2a (referring to FIG. 9) so that as the pressure measuring head 2a rotates through 360 degrees, it will retain with preferred conduction of signals and power with meter body 1a. Therefore, the whole operation is more convenient and easily despite the position of the air tap of the tire. The liquid crystal display 14a may face to the use with a correct orientation for measuring and monitoring the air pressure of a tire.

The pressure measuring head 2 may rotate with respect to the meter body 1 through 360 degrees so as to match the air tap of a tire and thus to decide an optimum position. The wire winding incorrectly between the meter body 1a and the pressure measuring head 2a is avoided. Therefore, it may prevent the tire meter pressure from improper use.

In the pressure measuring head 2a of the aforesaid electronic tire pressure meter, as the air tap 21a is inserted into the tap of a tire, the pressuring sensing electronic element 22a serves to sense the pressure automatically so that the measured signal can be transferred the conductive pins 131a of the circuit board 13a of the meter body 1a and is digitally displayed on the liquid crystal panel 14a. The switching button 15a serves to switch a power source for turning on or open the pressure measuring of the electronic tire pressure meter. However, these are known in the prior art, and thus the details will not be described herein.

Figure 10:
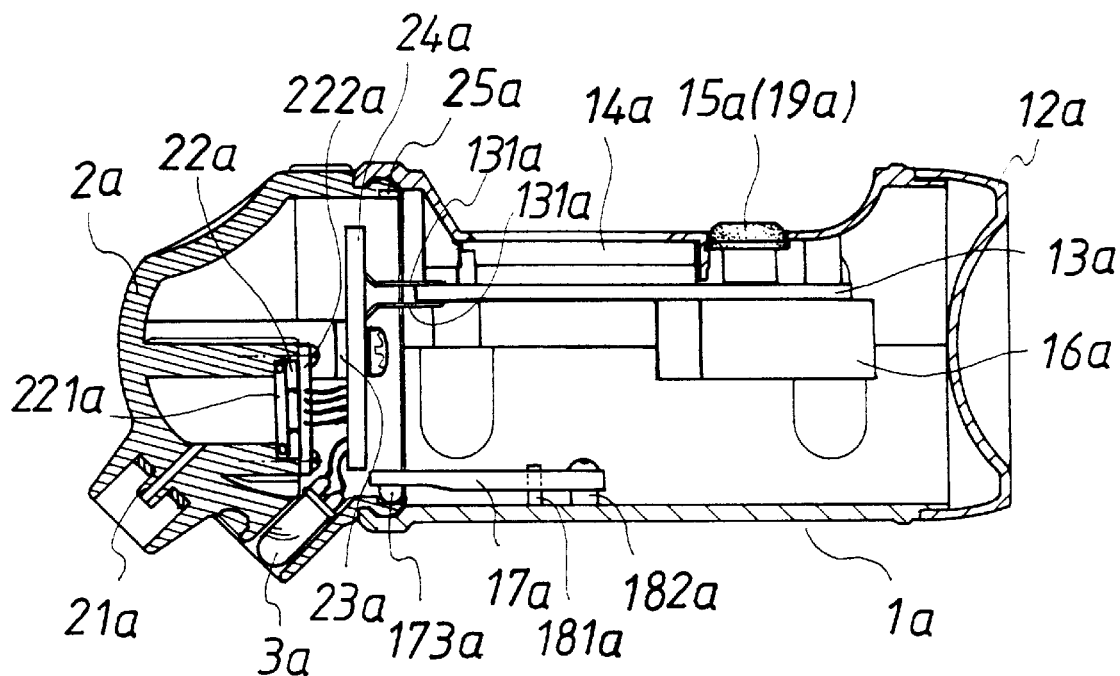
FIG. 10 is a cross sectional view showing that after rotating, the pressure measuring head faces downwards according to second embodiment in the present invention.

In the aforesaid electronic tire pressure gauge with a continuous rotary pressure measuring head, the inner edge of the pressure measuring head 2 may be installed with a plurality of grooves 25a which are arranged around the edge and the elastomer 17a is formed with a respective protrusion 173a which can be buckled to the grooves 25a on the edge of the pressure measuring head 2a and may be adjusted from one groove to another groove (referring to FIG. 10). Therefore, no matter the pressure measuring head 2a is rotated to any angle, a preferred buckling effect is obtained.

In the electronic tire pressure gauge with a continuous rotary pressure measuring head of the present invention, a light emitting element 3a is installed at a select position of the pressure measuring head 2a. The light emitting element 3a is connected to an illumination switching button 19 installed at predetermined position at the outer side of the meter body 1 through the conductive disk 24a and the conductive pins 131a of the circuit board 13a. Thus, in the dark, or as the illumination is too weak, the switching button 19a serves to provide a sufficient illumination so that the user may look for the tap conveniently.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A electronic tire pressure gauge with a rotary pressure measuring head comprising a meter body and a pressure measuring head; wherein the meter body has a circuit board, a liquid crystal panel, a power switching button, and a battery seat for receiving a battery therein; the meter body is rotatably engaged with respect to the pressure measuring head; and an elastomer is firmly secured at a select portion thereof;

the pressure measuring head is installed with a pressure sensing electronic element; the pressure measuring head rotates with respect to the meter body as desired so as to match the air tap of a tire and thus to decide an optimum position so that the liquid crystal panel correctly faces to the user to measure the tire pressure conveniently and check the value of the tire pressure easily; and an inner wall of the pressure measuring head is installed with a stopper so that the stopper stops the elastomer of the meter body as the stopper contacts the elastomer.

2. A electronic tire pressure gauge with a rotary pressure measuring head comprising a meter body and a pressure measuring head; wherein the meter body has a circuit board, a liquid crystal panel, a power switching button, and a battery seat for receiving a battery therein; the meter body is rotatably engaged with respect to the pressure measuring head; and an elastomer is firmly secured at a select portion thereof;

the pressure measuring head is installed with a pressure sensing electronic element; the pressure measuring head rotates with respect to the meter body as desired so as to match the air tap of a tire and thus to decide an optimum position so that the liquid crystal panel correctly faces to the user to measure the tire pressure conveniently and check the value of the tire pressure easily; and an inner edge of the pressure measuring head is installed with a plurality of grooves which are arranged around the edge and the elastomer is formed with a respective protrusion which is capable of being buckled to the grooves on the edge of the pressure measuring head and can be adjusted from one groove to another groove; therefore, no matter the pressure measuring head is rotated to any angle, a preferred positioning can be obtained.

3. An electronic tire pressure gauge with a continuous rotary pressure measuring head comprises a meter body and a pressure measuring head, wherein the meter body is installed with a circuit board, a liquid crystal panel, a power switching button, a battery seat for receiving batteries and others; the meter body is rotatably engaged with respect to the pressure measuring head; an inner wall of the air tap of the electronic element is installed with a pressure sensing electronic element; characterized in that:

one end of the circuit board in the meter body is installed with a plurality of conductive pins which are arranged with one adjacent to another, and a center of the pressure measuring head is installed with a locking post for locking and positioning a conductive disk; one lateral side of the conductive disk is installed with a plurality of adjacent conductive tracks, while another surface is used to be connected pins of selective electronic elements to the conductive tracks;

by aforesaid structure, the plurality of conductive pins spaced engaged to the meter body are contact with the selective tracks of the conductive disk of the pressure measuring head so that as the pressure measuring head rotates through 360 degrees, it will retain with preferred conduction of signals and power with meter body.

4. A electronic tire pressure gauge with a rotary pressure measuring head comprising a meter body and a pressure measuring head; wherein the meter body is formed by two casings and has a circuit board, a liquid crystal panel, a power switching button, and a battery seat for receiving a battery therein; the meter body is rotatably engaged with respect to the pressure measuring head; and an elastomer is firmly secured at a select portion thereof; and the pressure measuring head is installed with a pressure sensing electronic element; the pressure measuring head rotates with respect to the meter body as desired so as to match the air tap of a tire and thus to decide an optimum position so that the liquid crystal panel correctly faces to the user to measure the tire pressure conveniently and check the value of the tire pressure easily.

5. The electronic tire pressure gauge with a continuous rotary pressure measuring head as claimed in claim 1, wherein a distal end of the meter body is engaged with a rear cover.

6. The electronic tire pressure gauge with a continuous rotary pressure measuring head as claimed in claim 3, wherein an elastomer with protrusion is installed at a selective portion of the meter body, and an inner edge of the pressure measuring head is installed with a plurality of grooves which are arranged around the edge; the protrusion of the elastomer is buckled to the grooves on an edge of the pressure measuring head and is adjusted from one groove to another groove; therefore, no matter that the pressure measuring head is rotated to any angle, therefore, a preferred buckling effect is obtained.

7. The electronic tire pressure gauge with a continuous rotary pressure measuring head as claimed in claim 3, wherein the plurality of conductive pins of the circuit board of the conductive pins are alternatively arranged at a left and a right side, or arranged with a selective order so that one is adjacent to another.

8. The electronic tire pressure gauge with a continuous rotary pressure measuring head as claimed in claim 3, wherein the conductive pins are made by punching elastic metal.

9. The electronic tire pressure gauge with a continuous rotary pressure measuring head as claimed in claim 3, wherein the electronic element is a pressure sensing electronic element or a light emitting element.

10. The electronic tire pressure gauge with a continuous rotary pressure measuring head as claimed in claim 3, wherein a light emitting element is installed at a select position of the pressure measuring head; and the light emitting element is connected to an illumination switching button installed at predetermined position at an outer side of the meter body through the conductive disk and the conductive pins of the circuit board.

11. The electronic tire pressure gauge with a rotary pressure measuring head as claimed in claim 1, wherein a light emitting element is installed at a select position of the pressure measuring head; and the light emitting element is connected to an illumination switching button installed at a predetermined position at an outer side of the meter body so as to provide a sufficient illumination.

* * * * *